United States Patent [19]

Daponte et al.

[11] Patent Number: 5,204,174

[45] Date of Patent: Apr. 20, 1993

[54] FINE FIBER WEBS WITH IMPROVED PHYSICAL PROPERTIES

[75] Inventors: Diego H. Daponte, Woodstock; Susan E. Shawver, Alpharetta; Sharon L. Watkins, Roswell, all of Ga.; Hugo P. Watts, Larkfield, England

[73] Assignee: Kimberly-Clark Corporation, Neenah, Wis.

[21] Appl. No.: 518,904

[22] Filed: May 4, 1990

[51] Int. Cl.$^5$ .................... D04H 3/03; D04H 3/05; D04H 3/16

[52] U.S. Cl. .................... 428/286; 156/62.4; 156/62.8; 156/308.2; 264/210.8; 264/211.12; 264/211.2; 428/288; 428/296; 428/302; 428/171; 428/172

[58] Field of Search .............. 428/286, 288, 296, 302; 156/62.4, 62.8, 308.2; 264/210.8, 211.12, 211.2

[56] References Cited

U.S. PATENT DOCUMENTS

| | | | |
|---|---|---|---|
| D. 264,512 | 5/1982 | Rogers | D59/2 |
| 3,444,117 | 5/1969 | Higgins et al. | 260/28.5 |
| 3,841,953 | 10/1974 | Lohkamp et al. | 161/150 |
| 3,849,241 | 11/1974 | Butin et al. | 161/169 |
| 3,959,421 | 5/1976 | Weber et al. | 264/6 |
| 4,100,324 | 7/1978 | Anderson et al. | 428/288 |
| 4,197,375 | 4/1980 | Fox | 525/1 |
| 4,211,819 | 7/1990 | Kunimune et al. | 428/374 |
| 4,288,484 | 9/1981 | Norota et al. | 428/113 |
| 4,359,561 | 1/1982 | Fraser et al. | 526/88 |
| 4,363,904 | 12/1982 | Fraser et al. | 526/348.2 |
| 4,395,519 | 7/1983 | Minami et al. | 525/240 |
| 4,673,711 | 6/1987 | Sharps, Jr. et al. | 525/240 |
| 4,678,834 | 7/1987 | Boivin et al. | 525/74 |
| 4,761,450 | 8/1988 | Lakshmanan et al. | 524/488 |
| 4,774,277 | 9/1988 | Janac et al. | 524/474 |
| 4,797,318 | 1/1989 | Brooker et al. | 428/283 |
| 4,826,909 | 5/1989 | Lakshmanan et al. | 524/478 |
| 4,830,907 | 5/1989 | Sawyer et al. | 428/225 |
| 4,943,615 | 7/1990 | Yamawaki | 525/240 |
| 5,073,436 | 12/1991 | Antonacci et al. | 428/219 |

FOREIGN PATENT DOCUMENTS 337662 10/1989 European Pat. Off. .
394524 10/1990 European Pat. Off. .

OTHER PUBLICATIONS

Polymer Chemistry, Chapman and Hall, Ltd. (London), 1973, p. 58.

NRL Report 4364, Manufacture of Superfine Organic Fibers, May 25, 1954.

NRL Report 5265, An Improved Device for the Formation of Superfine, Thermoplastic Fibers, Feb. 11, 1959.

Primary Examiner—James C. Cannon
Attorney, Agent, or Firm—William D. Herrick

[57] ABSTRACT

There is disclosed a nonwoven web consisting of highly drawn and unoriented thermoplastic fibers formed from a blend of propylene polymer and butylene polymer, wherein the blend by weight is from 90% to 50% polypropylene and from 10% to 50% polybutylene. The blend can be a blend of a homopolymer of polypropylene and a homopolymer of polybutylene; a homopolymer of polypropylene and a copolymer of butylene; a copolymer of propylene and a homopolymer of polybutylene; and a copolymer of propylene and a copolymer of butylene. In addition ternary blends (homopolymers of polypropylene, copolymers of propylene and butylene, terpolymers (propylene, 1-butene, and ethylene), and blends of terpolymers with polypropylene are useful. The resulting nonwoven webs have enhanced toughness, tear resistance, drape, and conformability.

40 Claims, 2 Drawing Sheets

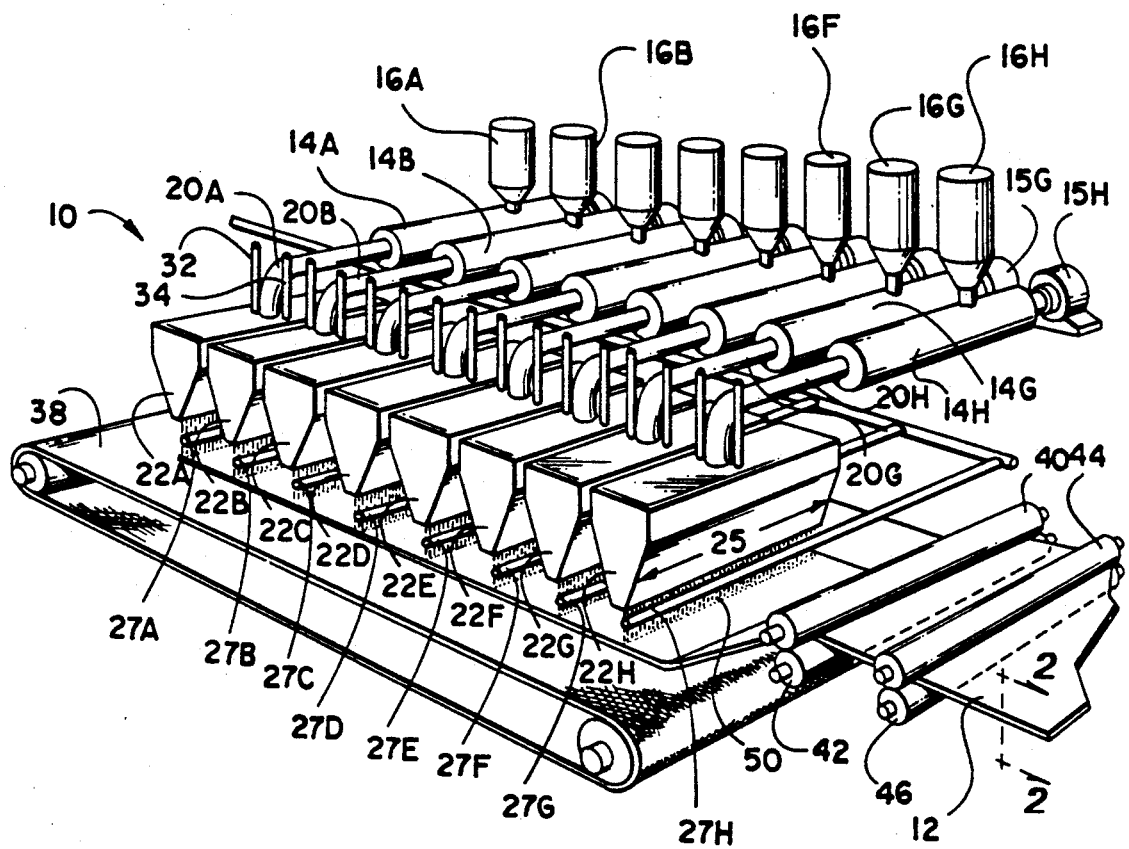
Fig_1

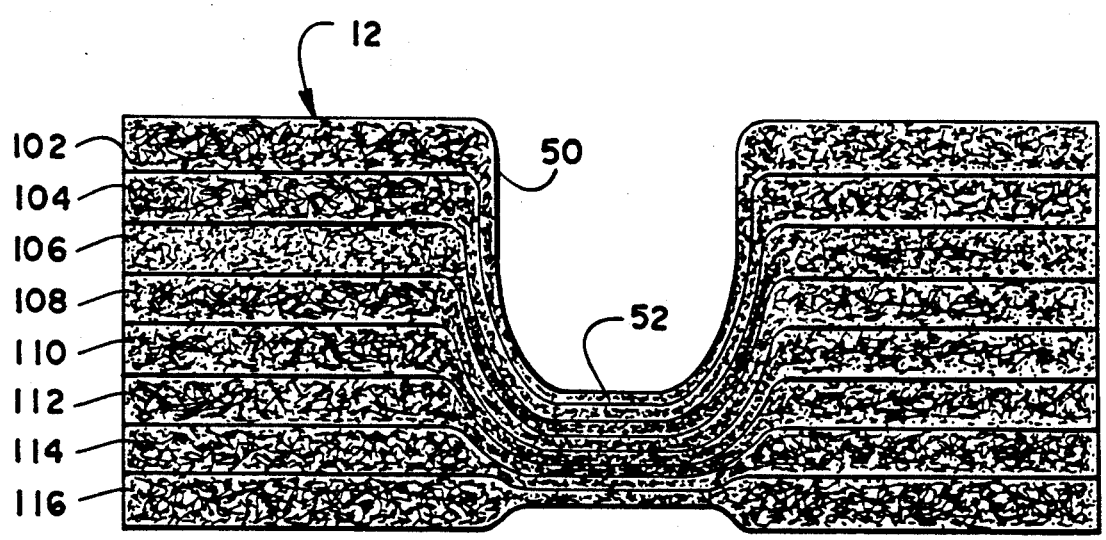
Fig_2

FINE FIBER WEBS WITH IMPROVED PHYSICAL PROPERTIES

BACKGROUND OF THE INVENTION

This invention relates generally to nonwoven webs consisting of thermoplastic fibers, and more particularly concerns such webs which are formed from blends of polypropylene resins and polybutylene resins.

Nonwoven webs formed of thermoplastic fibers are well-known in the art and have found uses in a variety of applications. In one application, such nonwoven webs are formed by melt-blowing and are used as disposable industrial wipers. Such industrial wipers find application in numerous manufacture and maintenance facilities where personnel find it necessary to wipe up oil, grease, and water from a variety of surfaces. One such wiper made of melt-blown polypropylene fibers is manufactured and sold by Kimberly-Clark Corporation, the assignee of the present invention, under the trademark Kimtex ®.

Melt-blown nonwoven wipers of polypropylene thermoplastics fibers have an advantage over cloth wipers in being cost effectively disposable with similar wiping characteristics as compared to cloth. Particularly, industrial wipers must be able to quickly pick up spilled liquids, both oil based and water based, and leave a clean, streak free surface. In addition, the wipers must have sufficient capacity to hold such liquids within the wiper structure until it is desired to remove the liquid by pressure such as by wringing.

Nonwoven melt-blown industrial wipers formed from polypropylene resin in the past have performed adequately in terms of their wiping characteristics, particularly with respect to oil and, when treated with a surfactant, with respect to water. Moreover, nonwoven industrial wipers made of polypropylene fibers have exhibited resistance to most commercially available solvents. A superior nonwoven melt-blown wiper, however, could be achieved by increasing toughness, increasing tear resistance, and improving drape and conformability.

SUMMARY OF THE INVENTION

It is therefore an object of the present invention to provide a nonwoven web consisting of thermoplastic fibers which web will display improved toughness, tear resistance, drape, and conformability characteristics over conventional melt-blown webs formed of polypropylene fibers.

It is likewise an object of the present invention to provide an industrial wiper comprising a nonwoven melt-blown web consisting of thermoplastic fibers which will provide improved toughness, tear resistance, drape, and conformability characteristics over conventional melt-blown wipers formed of polypropylene fibers.

The foregoing objectives are obtained by nonwoven webs consisting of highly drawn and unoriented fine thermoplastic fibers formed from blends of polypropylene and polybutylene including blends of homopolymers of polypropylene and homopolymers of polybutylene; from blends of homopolymers of polypropylene and copolymers of butylene; from blends of copolymers of propylene and homopolymers of polybutylene; and from blends of copolymers of propylene and copolymers of butylene. In addition the foregoing objects can be obtained by nonwoven webs consisting of highly drawn and unoriented fine thermoplastic fibers formed from terpolymers composed of three monomers, propylene, 1-butene, and ethylene, and blends of such terpolymers with polypropylene. The foregoing objects are also achieved by nonwoven webs consisting of highly drawn and unoriented fine thermoplastic fibers formed from ternary blends of homopolymers of polypropylene, copolymers of propylene, and butylene.

In connection with the present invention, "highly drawn thermoplastic fibers" refers to fibers that are drawn to a ratio of substantially greater than 14 to 1 (generally greater than 1000 to 1) in the forming process. Also in connection with the present invention, "unoriented fine thermoplastic fibers" refers to fibers which solidify in a relaxed condition (not under tension). Such highly drawn and unoriented fine fibers are characteristically formed by melt-blowing techniques as well as other fiber forming techniques such as melt-spraying.

More particularly, the foregoing objectives are realized by a nonwoven melt-blown web consisting of highly drawn and unoriented thermoplastic fibers formed by melt-blowing a blend comprising polypropylene and polybutylene. Particularly, the blend of polypropylene and polybutylene is from 90-50% by weight of polypropylene and from 10-50% by weight of polybutylene. More particularly, in the case of a nonwoven wiper, the blend is preferred to be from 85% to 80% by weight of polypropylene and from 15% to 20% by weight of polybutylene.

In connection with the present invention, the prior art European Patent Application No. 89303407.4 of Don & Low Ltd. has disclosed the usefulness of blending polypropylene and polybutylene to form fibers, tapes, and films where the thermoplastic fibers, tapes, and films are drawn to a ratio of at least 8:1 to produce an oriented molecular structure. Particularly, the Don & Low reference discloses thermoplastic fibers, tapes, and films that have improved strength as measured by tenacity which is the maximum stress they can resist without rupture. Such thermoplastic fibers, tapes, and films result from blending up to 10% by weight of polybutylene with polypropylene with from 2% to 4% by weight of polybutylene being preferred. The Don & Low reference, however, teaches that "it has been found that if the polybutylene proportion is increased beyond ten percent there is little if any increase in strength [tenacity]". Also the Don & Low reference does not teach improved elongation. As will be demonstrated hereinbelow the nonwoven melt-blown and melt-spray webs of the present invention result from a blend of polypropylene and polybutylene with the polybutylene in excess of 10%. Moreover, the thermoplastic fibers of the present invention are drawn to a ratio of substantially greater than 14 to 1 and are not oriented as a result of the melt-blowing or melt-spraying process.

In addition, the prior art Brooker et al. U.S. Pat. No. 4,797,318, assigned to Kimberly-Clark, the assignee of the present invention, discloses particle laden melt-blown materials. Particularly, Brooker discloses the addition of particulate matter to a melt-blown web during the melt-blowing process. Such particulate matter may include a wide variety of materials depending on the use of the web such as activated carbon, potassium permanganate, baking soda, clays, diatomaceous earth, and the like. The particulate is introduced into the fiber stream during the melt-blowing process so that the particulate becomes embedded in the fibers before they solidify. The Brooker patent teaches that blends of polypropylene and polybutylene may be useful when polybutylene is added in amounts of from 5-30% by weight of the total blend.

BRIEF DESCRIPTION OF THE DRAWINGS

FIG. 1 is a schematic diagram showing machinery for producing a nonwoven melt-blown web in accordance with the present invention; and FIG. 2 is a schematic cross-sectional representation of the nonwoven melt-blown web of the present invention.

DETAILED DESCRIPTION OF THE INVENTION

While the invention will be described in connection with a preferred embodiment and procedure, it will be understood that we do not intend to limit the invention to that embodiment or procedure. On the contrary, we intend to cover all alternatives, modifications, and equivalents as may be included within the spirit and scope of the invention as defined by the appended claims.

Turning to FIG. 1 there is shown a web forming machine 10 for forming a melt-blown web 12 made up of a number of layers (102, 104, 106, 108, 110, 112, 114, and 116 in FIG. 2) of melt-blown fibers 50. The machine 10 includes eight identical extruders 14A-H with corresponding hoppers 16A-H for receiving thermoplastic resin pellets. The extruders 14A-H include internal screw conveyors which are driven by motors 15A-H. The extruders 14A-H are heated along their lengths to the melting temperature of the thermoplastic resin pellets to form a melt. The screw conveyors driven by motors 15A-H force the thermoplastic material through the extruders into attached delivery pipes 20A-H which are connected to die heads 22A-H, each having a die width 25.

Die head 22A, for example, comprises a die tip 24 which has a die opening or orifice (not shown). The die tip may be recessed, flush, or stick out. Hot fluid, usually air, is supplied to the die tip via pipes 32 and 34 (FIG. 1) which terminate in channels adjacent to the orifice of the die tip.

As the thermoplastic polymer exits the die tip for each die head, the high pressure air attenuates and breaks up the polymer stream to form fibers at each die head. The fibers are then in accordance with the present invention quenched with a mist of water from spray nozzles 27A-H. The spray nozzles are located just below the orifice of the die tip and spray the fibers 50 with water at room temperature or slightly above at a flow rate of at least 0.02 liter/min/inch width of die tip. Fiber quenching is convenitonal as demonstrated by U.S. Pat. No. 3,959,421. If desired, a surfactant can be added to the fibers by adding the surfactant to the quenching water. It should also be noted that significantly improved toughness and tear resistance result only if the fibers are subjected to quenching. Improved drape and conformability results whether or not the fibers are subjected to quenching.

Once the fibers have been quenched, they are deposited in layers on a moving foraminous belt 38 to form the layered web 12. A vacuum is drawn behind the foraminous belt 38 to draw the fibers onto the belt 38 during the process of melt-blowing. Separate vacuum chambers behind the foraminous belt may be provided for each die head 22A-H. Once the fiber layers have been deposited on the moving belt 28 by the multiple die heads 22A-H, the web 12 is drawn from the belt 38 by withdrawal rolls 40 and 42. Embossing rolls 44 and 46 engage the web 12 after the withdrawal rolls to emboss the web with a pattern 52 (FIG. 2).

The foregoing description of the melt-blowing machine 10 is generally conventional and well-known in the art as demonstrated by NRL Report 4364, "Manufacture of Super-Fine Organic Fibers", by V. A. Wendt, E. L. Boon, and C. D. Fluharty; NRL Report 5265, "An Improved Device for the Formation of Super-Fine Thermoplastic Fibers", by K. D. Lawrence, R. T. Lukas, and J. A. Young; and U.S. Pat. No. 3,849,241, issued Nov. 19, 1974, to Buntin, et al. It also will be appreciated by one of ordinary skill in the art that a single head melt-blowing machine can be used instead of the multiple bank machine illustrated. It should also be appreciated that the web 12 may be comprised of a single layer, multiple layers which are all identical in composition, or multiple layers some of which layers are made in accordance with the present invention and some of which layers are conventional. Moreover, ordinary skill in the art will appreciate that fine adjustment of the equipment and process may be required to optimize performance and efficiency. Such fine adjustment can be accomplished by one of ordinary skill without undue experimentation.

In addition the fibers and the resulting web can be formed by other fiber forming techniques including, for example, melt-spray techniques. Melt-spraying is a process for forming fibers from a fiber forming resin using compact spray head designs usually including one to four spray heads in a cluster. The equipment includes a die housing with a hydraulic chamber and a retractable piston assembly for releasing molten resin. As the molten resin is released, it is contacted and drawn by a primary air supply which completely surrounds the molten resin and contacts it at a predetermined angle. If additional drawing and attenuation of the newly formed fibers is desired, secondary fiberization air also may be utilized. The secondary fiberization air will most typically include at least two fluid streams which each impinge upon the resin/fibers at a second angle.

In more refined embodiments the fiberization air can also be angled such that it will spiral around the forming fibers. Additionally, the piston within the hydraulic chamber may be cycled on and off to interrupt the flow of the fiber forming resin thereby creating discrete pluralities of fibers.

Both melt-blowing and melt-spraying techniques produce fibers that are highly drawn and unoriented.

In accordance with the present invention, it has been found that an improved nonwoven web of highly drawn and unoriented thermoplastic fibers can be formed by melt-blowing a blend of polypropylene and polybutylene to enhance certain properties in the melt-blown web 12, as compared with 100% melt-blown polypropylene. Specifically, the melt-blown web 12 formed from melt-blowing a blend of polypropylene and polybutylene improves the toughness (the elongation and absorbed energy), tear resistance, drape, and conformability. Particularly, we have found that blends of from 90% to 50% polypropylene and from 10% to 50% polybutylene produce nonwoven melt-blown webs with these improved characteristics. The advantages of the present invention can be realized by blending homopolymers of polypropylene and polybutylene;

by blending copolymers of propylene and homopolymers of polybutylene; by blending homopolymers of polypropylene and copolymers of butylene; and by blending copolymers of propylene and copolymers of butylene. The copolymers of propylene may have ethylene in amounts ranging up to about 3% by weight. The copolymers of butylene may have ethylene in amounts ranging up to about 6% by weight. In addition the invention may be carried out by using ternary blends of propylene polymers and polybutylene, which by way of example may be a blend of a homopolymer of polypropylene, an ethylene copolymer of propylene, and an ethylene copolymer of butylene. The invention may also be realized by using terpolymers composed of three monomers, propylene, 1-butene, and ethylene, and blends of such terpolymers with polypropylene.

Webs in accordance with the present invention can be formed at polymer throughputs of from 1 to 15 pounds per inch of die head width per hour (pih). Once the melt-blown web has been formed, the material may be bonded or unbonded. The bond pattern may be a line pattern, a weave pattern, or a point pattern, but the point pattern, with bonding occurring within certain discrete areas on the material, is preferred. The bonding may be accomplished by ultrasonic heating or by embossing with heated rolls. In connection with the present invention, most webs described in the following examples were heat embossed with a weave pattern such as that shown in U.S. Pat. No. Des. 264,512. The resulting bonded webs had a bonded area of about 18% of the total area.

In carrying out the present invention, the blends and ternary blends were formed by simply mixing the thermoplastic pellets in the proper weight proportions before being added to the hoppers 16A-H. The terpolymers were polymerized in the desired proportions during manufacture.

Nonwoven webs formed from blends, ternary blends, terpolymers, and terpolymer blends utilizing the present invention were made and tested in accordance with the following examples which illustrate the invention.

EXAMPLE 1

A melt-blowing machine similar to that shown in FIG. 1 was used to form a control web, Sample 1, from 100% polypropylene and a second web, Sample 2, from a blend of 85% polypropylene and 15% polybutylene. The polypropylene used for the control web, Sample 1, was a homopolymer with a melt flow of 800 g/10 min (ASTM D1288, Condition L, (230° C., 2160 g weight)) and a narrow molecular weight distribution. Such a polypropylene homopolymer is manufactured by Himont U.S.A., Inc. of Wilmington, Del. and designated Valtec HH442H. The polypropylene used for the inventive melt-web, Sample 2, was also Valtec HH442H. The butylene polymer used for Sample 2 was Duraflex DP-8910, which is an ethylene copolymer (6% ethylene) and is manufactured by Shell Chemical Company of Houston, Tex. Both webs were heat embossed with a conventional woven bonding pattern. The melt-blowing machine was set up in accordance with the following process conditions for Samples 1 and 2:

| Machine Configuration: A. recess die tip B. single bank C. water quench with surfactant | | | |
|---|---|---|---|
| | | Sample 1 | Sample 2 |
| Set Points: | | | |
| Extruder Barrel Pressure | psi | 617 | 614 |
| Primary Air Pressure | psi | 5.5 | 6.3 |
| Primary Air Temperature | °F. | 541 | 514 |
| Forming Distance | in | 18 | 12 |
| Measured Variables: | | | |
| Die Tip Pressure | psi | 78 | 117 |
| Die Tip (Melt) Temperature | °F. | 522 | 514 |
| Bonding: | | | |
| Pattern Roll Temperature | | | |
| Set Point | °F. | 220 | 200 |
| Actual Surface | °F. | | 175 |
| Anvil Roll Temperature | | | |
| Set Point | °F | 205 | 180 |
| Actual Surface | °F. | | 167 |
| Pressure (Average) | psi | 22 | 17 |
| Line Speed | fpm | 38 | 27 |

In order to provide an accurate comparison between conventional Sample 1 and inventive Sample 2, the actual data for the conventional web, Sample 1, has been normalized to a basis weight of 80 gsm, the basis weight of the inventive web, Sample 2. Both the actual data and the normalized data which show the characteristics of Samples 1 and 2 are set out in Table 1 below.

TABLE 1

| | | ACTUAL DATA | | | NORMALIZED DATA | | |
|---|---|---|---|---|---|---|---|
| | | SAMPLE 1 (Bonded) 100% PP (HH442H) | SAMPLE 2 85:15 PP:PB (PP = HH442H) (PB = DP8910) | % Change (PP = Base) | SAMPLE 1 (Bonded) 100% PP (HH442H) | SAMPLE 2 85:15 PP:PB (PP = HH442H) (PB = DP8910) | % Change (PP = Base) |
| Basis Weight | gsm | 82 | 80 | −2% | 80 | 80 | 0% |
| Bulk | mm | 0.77 | 0.76 | — | 0.75 | 0.76 | — |
| Grab Tensile | MD, Dry | | | | | | |
| Peak Load | g | 4578 | 4950 | 11 8% | 4483 | 4950 | 10% |
| Peak Energy | kg-mm | 97 | 132 | 36% | 95 | 132 | 39% |
| Peak Elong | mm | 33 | 41 | 24% | 32 | 41 | 27% |
| Fail Energy | kg-mm | 162 | 212 | 31% | 159 | 212 | 33% |
| Grab Tensile | CD, Dry | | | | | | |
| Peak Load | g | 4416 | 4344 | −2% | 4324 | 4344 | 0% |
| Peak Energy | kg-mm | 91 | 122 | 34% | 89 | 122 | 37% |
| Peak Elong | mm | 33 | 48 | 45% | 32 | 48 | 49% |
| Fail Energy | kg-mm | 152 | 194 | 28% | 149 | 194 | 30% |
| Grab Tensile | MD, Wet | | | | | | |
| Peak Load | g | 4488 | 4424 | −1% | 4395 | 4424 | 1% |
| Peak Energy | kg-mm | 78 | 125 | 61% | 76 | 125 | 65% |
| Peak Elong | mm | 28 | 43 | 55% | 27 | 43 | 59% |
| Fail Energy | kg-mm | 138 | 206 | 49% | 135 | 206 | 53% |
| Grab Tensile | CD, Wet | | | | | | |

TABLE 1-continued

|  |  | ACTUAL DATA | | | NORMALIZED DATA | | |
| --- | --- | --- | --- | --- | --- | --- | --- |
|  |  | SAMPLE 1 (Bonded) 100% PP (HH442H) | SAMPLE 2 85:15 PP:PB (PP = HH442H) (PB = DP8910) | % Change (PP = Base) | SAMPLE 1 (Bonded) 100% PP (HH442H) | SAMPLE 2 85:15 PP:PB (PP = HH442H) (PB = DP8910) | % Change (PP = Base) |
| Peak Load | g | 4510 | 4292 | −5% | 4416 | 4292 | −3% |
| Peak Energy | kg-mm | 89 | 145 | 63% | 87 | 145 | 66% |
| Peak Elong | mm | 32 | 53 | 66% | 31 | 53 | 69% |
| FAil Energy | kg-mm | 147 | 209 | 42% | 144 | 209 | 45% |
| Trap Tear | | | | | | | |
| MD | g | 843 | 1146 | 36% | 825 | 1146 | 39% |
| CD | g | 710 | 937 | 32% | 695 | 937 | 35% |
| Cup Crush | | | | | | | |
| Load | g | 316 | 231 | −27% | 309 | 231 | −25% |
| Energy | g/mm | 6274 | 4116 | −34% | 6143 | 4116 | −33% |

In connection with the characteristics reported in Table 1, the basis weight was measured in accordance with Federal Test Method 191A-5 and expressed in grams per square meter (gsm). The bulk was measured in accordance with the Ames Method and expressed in millimeters (mm). The grab tensile strength was measured in accordance with Method 5100, Federal Test Method 191A and expressed in grams (g), kilogram-millimeters (k.gmm), and millimeters (mm). The trapezoid tear was measured in accordance with Method 5135, Federal Test Method 191 and expressed in grams (g). The cup crush is a measure of a fabric's resistance to crushing. The lesser the resistance is, the more comformable the fabric is. Cup crush is measured by forming a linear sample of the fabric inside a cup having an inside diameter of 2.5 inches. A foot then descends into the cup crushing the sample, and the instrument measures the peak load and the energy needed to crush the sample. Cup crush is expressed in grams (g) and grams.-millimeter (g.mm).

In order to measure toughness, the various samples were subjected to tensile testing both wet and dry in the machine direction and the cross-machine direction. Toughness is determined by the amount of energy that the material will absorb prior to failure. The peak energy is the amount of energy the material will absorb until the peak load is achieved. The fail energy is the amount of total energy the material will absorb until it finally fails by separating. Particularly as the stress to which the web is subjected is increased, the web begins stretching or elongating. At some point, the web reaches a peak loading at which failure begins and additional stressing does not increase the loading on the web. As the material begins failing, further elongation results under decreasing loading. The amount of peak energy the material experiences is the integral of the load v. elongation curve for the web from 0 load to the peak of the load. The amount of failed energy is the integral of the load v. elongation curve for the web from the initial 0 load until rupture occurs and the load again returns to 0. Both peak energy and fail energy give a good indication of the toughness of a web.

Consequently, it can be seen from Table 1 that Sample 2, made in accordance with the present invention, demonstrates a substantial increase in the peak and fail energy over that of the prior art 100% polypropylene melt-blown web of Sample 1. Particularly, Sample 2 has an increase in peak energy in the wet cross-machine direction of 66% (normalized) over the control Sample 1 and at worst has a 37% (normalized) increase in peak energy in the dry cross-machine direction as compared to Sample 1.

While toughness measures a web's resistance to initial tearing, trapezoid tear measures the web's resistance to the propagation of a tear after an initial tear. As can be seen again from Table 1, Sample 2 shows a 39% and 35% increase in its tear resistance over that of the control Sample 1.

In connection with the cup crush test, lower numbers are consistent with improved drape and conformability. Again, the inventive Sample 2 shows improved drape and conformability over the control Sample 1.

EXAMPLE 2

In order to test the effect, if any, of bonding on the webs of the present invention, Samples 3 and 4 were prepared. Sample 3, which included a number of webs, some bonded and some unbonded, was a nonwoven melt-blown web formed of 100% polypropylene (homopolymer, HH442H). Sample 4, which included a number of webs, some bonded and some unbonded, was formed of a blend of 80% polypropylene (homopolymer, HH442H) and 20% butylene polymer (copolymer, DP-8910). The bonded webs for Sample 3 and 4 were heat bonded with a conventional weave pattern. The samples were formed by melt-blowing in accordance with the following machine parameters.

| Machine Configuration: A. recess die tip B. single bank C. water quench with surfactant | | | |
| --- | --- | --- | --- |
| | | Sample 3 | Sample 4 |
| Set Points: | | | |
| Extruder Barrel Pressure | psi | 650 | 650 |
| Primary Air Pressure | psi | 5.9 | 6.5 |
| Primary Air Temperature | °F. | 520 | 547 |
| Forming Distance | in | 17 | 17 |
| Measured Variables: | | | |
| Die Tip Pressure | psi | 51 | 41 |
| Die Tip (Melt) Temperature | °F. | 514 | 520 |
| Bonding: | | | |
| Pattern Roll Temperature | | | |
| Set Point | °F. | 220 | 220 |
| Actual Surface | °F. | 205 | 202 |
| Anvil Roll Temperature | | | |
| Set Point | °F. | 220 | 220 |
| Actual Surface | °F. | 210 | 209 |
| Pressure (Average) | psi | 18 | 16 |
| Line Speed | fpm | 27 | 24 |

The webs, both bonded and unbonded were tested, and the results were normalized to a basis weight of 80 gsm. The test results are reported in Tables 2 and 3 below. Table 2 reports the comparison between Samples 3 and 4 which were heat bonded with the conventional weave pattern and the bonding conditions set forth above. Table 3 shows the comparison between Samples 3 and 4 which samples were not bonded.

Sample 9 was a 70:30 blend; and Sample 10 was a 50:50 blend. The samples were melt-blown in accordance with the following process parameters.

TABLE 2

|  |  | ACTUAL DATA | | | NORMALIZED DATA | | |
|---|---|---|---|---|---|---|---|
|  |  | SAMPLE 3 100% PP (HH442H) | SAMPLE 4 80:20 PP:PB (PP = HH442H) (PB = DP8910) | % Change (PP = Base) | SAMPLE 3 100% PP (HH442H) | SAMPLE 4 80:20 PP:PB (PP = HH442H) (PB = DP8910) | % Change (PP = Base) |
| Basis Weight | gsm | 76 | 80 | 5% | 80 | 80 | 0 |
| Grab Tensile | MD, Dry | | | | | | |
| Peak Load | g | 3638 | 4340 | 19% | 3855 | 4367 | 13% |
| Peak Energy | kg-mm | 59 | 102 | 74% | 62 | 102 | 65% |
| Peak Elong | mm | 22 | 34 | 52% | 23 | 34 | 45% |
| Grab Tensile | CD, Dry | | | | | | |
| Peak Load | g | 3325 | 3749 | 13% | 3523 | 3772 | 7% |
| Peak Energy | kg-mm | 70 | 113 | 61% | 74 | 114 | 53% |
| Peak Elong | mm | 31 | 48 | 57% | 32 | 48 | 49% |
| Trap Tear | | | | | | | |
| MD - Load | g | 702 | 912 | 30% | 744 | 918 | 23% |
| CD - Load | g | 622 | 729 | 17% | 659 | 733 | 11% |

TABLE 3

|  |  | ACTUAL DATA | | | NORMALIZED DATA | | |
|---|---|---|---|---|---|---|---|
|  |  | SAMPLE 3 100% PP (HH442H) | SAMPLE 4 80:20 PP:PB (PP = HH442H) (PB = DP8910) | % Change (PP = Base) | SAMPLE 3 100% PP (HH442H) | SAMPLE 4 80:20 PP:PB (PP = HH442H) (PB = DP8910) | % Change (PP = Base) |
| Basis Weight | gsm | 79 | 81 | 3% | 80 | 80 | 0% |
| Grab Tensile | MD, Dry | | | | | | |
| Peak Load | g | 2918 | 3920 | 34% | 2954 | 3872 | 31% |
| Peak Energy | kg-mm | 43 | 97 | 124% | 44 | 95 | 119% |
| Peak Elong | mm | 21 | 37 | 76% | 21 | 37 | 72% |
| Grab Tensile | CD, Dry | | | | | | |
| Peak Load | g | 3171 | 3517 | 11% | 3211 | 3473 | 8% |
| Peak Energy | kg-mm | 73 | 116 | 59% | 73 | 114 | 55% |
| Peak Elong | mm | 34 | 52 | 53% | 34 | 51 | 49% |
| Trap Tear | | | | | | | |
| MD - Load | g | 663 | 1034 | 56% | 671 | 1021 | 52% |
| CD - Load | g | 682 | 812 | 19% | 691 | 802 | 16% |

As previously predicted, the bonded Sample 4 (Table 2) in accordance with the present invention is tougher and more tear resistant than the bonded conventional Sample 3. In addition, the unbonded Sample 4 (Table 3) in accordance with the present invention is substantially tougher and more tear resistant than the unbonded conventional Sample 3 of 100% polypropylene. Results showing the difference between bonded and unbonded webs seems to indicate that the improvements in toughness and tear are inherent in the melt-blown web and do not result from bonding.

EXAMPLE 3

In order to determine the effect of blends of polypropylene and polybutylene on the tactile properties of the resulting webs, additional nonwoven melt-blown Samples 5, 6, 7, 8, 9, and 10 were prepared. Sample 5 was a control sample and was formed from 100% polypropylene (homopolymer, HH442H). Samples 6-10 were formed of varying blends of polypropylene (homopolymer, HH442H) and butylene polymer (copolymer, DP-8910). Particularly, Sample 6 was a 90:10 blend; Sample 7 was an 85:15 blend; Sample 8 was an 80:20 blend;

Machine Configuration:
A. recess die tip
B. single bank
C. water quench with surfactant

|  |  | Samples 5-10 |
|---|---|---|
| Set Points: | | |
| Extruder Barrel Pressure | psi | 600 |
| Primary Air Pressure | psi | 5.4 |
| Primary Air Temperature | °F. | 540 |
| Forming Distance | in | 18 |
| Measured Variables: | | |
| Die Tip Pressure | psi | 130 |
| Die Tip (Melt) Temperature | °F. | 510 |
| Bonding: | | |
| Pattern Roll Temperature | | N |
| Set Point | °F. | O |
| Actual Surface | °F. | T |
| Anvil Roll Temperature | | |
| Set Point | °F. | B |
| Actual Surface | °F. | O |
|  |  | N |
| Pressure (Average) | psi | D |
|  |  | E |
| Line Speed | fpm | D |

The various Sample 5-10 were tested for their tactile properties and the results reported in Table 4 below.

TABLE 4

| SAMPLE NUMBER | COMPOSITION % PP HH442H | COMPOSITION % PB DP8910 | BASIS WEIGHT gsm | DRY BULK mm | CUP CRUSH LOAD g | CUP CRUSH ENERGY g-mm | DRAPE STIFFNESS MD cm | DRAPE STIFFNESS CD cm | HANDLEOMETER STIFFNESS MD g | HANDLEOMETER STIFFNESS CD g |
|---|---|---|---|---|---|---|---|---|---|---|
| 5 | 100% | 0% | 68 | 0.90 | 187 | 3534 | 5.0 | 4.0 | 57 | 50 |
| 6 | 90% | 10% | 72 | 0.80 | 123 | 2372 | 3.5 | 3.5 | 52 | 45 |
| 7 | 85% | 15% | 72 | 0.74 | 134 | 2572 | 4.1 | 3.0 | 51 | 44 |
| 8 | 80% | 20% | 69 | 0.77 | 151 | 3022 | 4.0 | 3.2 | 51 | 47 |
| 9 | 70% | 30% | 68 | 0.69 | 130 | 2426 | 3.9 | 3.0 | 47 | 36 |
| 10 | 50% | 50% | 69 | 0.60 | 120 | 2214 | 3.4 | 3.4 | 43 | 30 |

In connection with Table 4 above, drape stiffness was tested in accordance with ASTM Standard Test D1388 using a specimen of 1"×8" rather than 1"×6". Handleometer stiffness was tested in accordance with INDA Standard Test IST 90.0-75 (R82) using a specimen of 4"×4" rather than 8"×8". For each test, the lower the number, the more drapable the material. In all cases the inventive Samples 6–10 were less stiff and more drapable than the control Sample 5.

EXAMPLE 4

In order to test the effect of several permeations and combinations of homopolymers, copolymers, terpolymers, and ternary blends on the webs made in accordance with the present invention, Samples 11-19 were prepared. A control Sample 11 was prepared of 100% polypropylene (homopolymer HH442H). Sample 12 was formed from 100% copolymer of propylene (0.7% ethylene). The propylene copolymer for Sample 12 was an experimental polymer manufactured by Himont U.S.A., Inc. of Wilmington, Del. Sample 13 was formed from a blend of 80% polypropylene (homopolymer, HH442H) and 20% polybutylene which was a homopolymer manufactured by Shell Chemical Company of Houston, Tex. and sold under the designation PB-0800. Sample 14 was formed from a blend of 80% polypropylene (copolymer, 0.7% ethylene) and 20% butylene polymer (copolymer, PB-8910).

Sample 15 is an example of a ternary blend of polymers in accordance with the present invention. Particularly, Sample 15 was formed from a blend of 40% polypropylene (homopolymer, HH442H), 40% polypropylene (copolymer, 0.7% ethylene,), and 20% polybutylene (copolymer, 6% ethylene, DP8910).

Sample 16 was formed from 100% terpolymer (formed from three monomers, propylene, ethylene, and 1-butene) which was an experimental polymer manufactured by Himont U.S.A., Inc. of Wilmington, Del., identified by the designation 9573-30-1, and having a melt flow rate of 400 grams per 10 minutes. Sample 18 was formed from a blend of 50% terpolymer (formed from three monomers, propylene, ethylene, and 1-butene) which was an experimental polymer manufactured by Himont U.S.A., Inc. of Wilmington, Del., identified by 9582-35-1, and having a melt flow rate of 45 g/10 min and 50% polypropylene (homopolymer, HH442H). Samples 16 and 18 were unbonded. Samples 17 and 19 were formed from the same polymers as Samples 16 and 18 respectively. Samples 17 and 19, however, were bonded.

Samples 11-19 were formed by melt-blowing in accordance with the following parameters.

Machine Configuration:
A. recess die tip
B. single bank
C. water quench with surfactant

| | | Samples 11–12 | Sample 13 | Sample 14 |
|---|---|---|---|---|
| Extruder Barrel Pressure | psi | 500 | 670 | 540 |
| Primary Air Pressure | psi | 6.8 | 6.4 | 5.4 |
| Primary Air Temperature | °F. | 554 | 543 | 544 |
| Forming Distance | in | 17 | 17 | 17 |
| Measured Variables: | | | | |
| Die Tip Pressure | psi | 47 | 46 | 42 |
| Die Tip (Melt) Temperature | °F. | 520 | 533 | 526 |
| Bonding: | | | | |
| Pattern Roll Temperature | | N | N | N |
| Set Point | °F. | O | O | O |
| Actual Surface | °F. | T | T | T |
| Anvil Roll Temperature | | | | |
| Set Point | °F. | B | B | B |
| Actual Surface | °F. | O | O | O |
| | | N | N | N |
| Pressure (Average) | psi | D | D | D |
| | | E | E | E |
| Line Speed | fpm | D | D | D |

| | | Sample 15 | Sample 16 | Sample 17 |
|---|---|---|---|---|
| Die Zone Temperatures | °F. | 520 | 500 | 500 |
| Extruder Barrel Pressure | psi | | | |
| Primary Air Pressure | psi | 5.4 | 6.0 | 6.0 |
| Primary Air Temperature | °F. | 555 | 594 | 594 |
| Forming Distance | in | 16 | 16 | 16 |
| Measured Variables: | | | | |
| Die Tip Pressure | psi | 44 | 208 | 208 |
| Die Tip (Melt) Temperature | °F. | 526 | 507 | 507 |
| Bonding: | | | | |
| Pattern Roll Temperature | | N | N | |
| Set Point | °F. | O | O | 200 |
| Actual Surface | °F. | T | T | 191 |
| Anvil Roll Temperature | | | | |
| Set Point | °F. | B | B | 200 |
| Actual Surface | °F. | O | O | 194 |
| | | N | N | |
| Pressure (Average) | psi | D | D | 22 |
| | | E | E | |
| Line Speed | fpm | D | D | |

| | | Sample 18 | Sample 19 |
|---|---|---|---|
| Die Zone Temperatures | °F. | 550 | 550 |
| Extruder Barrel Pressure | psi | | |
| Primary Air Pressure | psi | 5.1 | 5.1 |
| Primary Air Temperature | °F. | 600 | 600 |
| Forming Distance | in | 16 | 16 |
| Measured Variables: | | | |
| Die Tip Pressure | psi | 158 | 158 |
| Die Tip (Melt) Temperature | °F. | 547 | 547 |
| Bonding: | | | |
| Pattern Roll Temperature | | N | |
| Set Point | °F. | O | 220 |
| Actual Surface | °F. | T | 208 |
| Anvil Roll Temperature | | | |
| Set Point | °F. | B | 220 |

-continued

| | | | | |
|---|---|---|---|---|
| Machine Configuration: A. recess die tip B. single bank C. water quench with surfactant | | | | |
| Actual Surface | °F. | ONE | 211 | |
| Pressure (Average) | psi | DE | 28 | |

-continued

| | | | | |
|---|---|---|---|---|
| Machine Configuration: A. recess die tip B. single bank C. water quench with surfactant | | | | |
| Line Speed | fpm | D | 37 | |

The test results for Samples 11 (control), 12, 13, and 14 are reported in Table 5.

TABLE 5

| | | ACTUAL DATA | | | NORMALIZED DATA | | |
|---|---|---|---|---|---|---|---|
| | | SAMPLE 11 PP Homopolymer 100% PP (HH442H) | SAMPLE 12 PP Copolymer 0.7% C2 100% PP Copolymer 0.7% ethylene | % Change (PP = Base) | SAMPLE 11 PP Homopolymer 100% PP (HH442H) | SAMPLE 12 PP Copolymer 0.7% C2 100% PP Copolymer 0.7% ethylene | % Change (PP = Base) |
| Basis Weight | gsm | 80 | 78 | −3% | 80 | 80 | 0% |
| Bulk | mm | 0.71 | 0.69 | — | 0.71 | 0.67 | — |
| Grab Tensile | MD, Dry | | | | | | |
| Peak Load | g | 3271 | 2763 | −16% | 3271 | 2834 | −13% |
| Peak Energy | kg-mm | 56 | 51 | −9% | 56 | 52 | −7% |
| Peak Elong | mm | 26 | 28 | 8% | 26 | 29 | 10% |
| Fail Energy | kg-mm | 112 | 101 | −10% | 112 | 104 | −8% |
| Grab Tensile | CD, Dry | | | | | | |
| Peak Load | g | 3557 | 3315 | −7% | 3557 | 3400 | −4% |
| Peak Energy | kg-mm | 91 | 90 | −1% | 91 | 92 | 1% |
| Peak Elong | mm | 41 | 42 | 2% | 41 | 43 | 5% |
| Fail Energy | kg-mm | 140 | 147 | 5% | 140 | 151 | 8% |
| Trap Tear | | | | | | | |
| MD | g | 823 | 728 | −12% | 823 | 747 | −9% |
| CD | g | 871 | 848 | −3% | 871 | 870 | 0% |
| Cup Crush | | | | | | | |
| Load | g | 258 | 178 | −31% | 258 | 183 | −29% |
| Energy | g/mm | 5398 | 3591 | −33% | 5398 | 3483 | −32% |
| Drape | | | | | | | |
| MD | cm | 4.4 | 3.4 | −23% | 4.4 | 3.5 | −21% |
| CD | cm | 3.6 | 3.0 | −17% | 3.6 | 3.1 | −15% |

| | | ACTUAL DATA | | | NORMALIZED DATA | | |
|---|---|---|---|---|---|---|---|
| | | SAMPLE 11 PP Homopolymer 100% PP (HH442H) | SAMPLE 13 PP Homopolymer PB Homopolymer 80% PP-HH442H 20% PB-0800 MELTBLOWN | % Change (PP = Base) | SAMPLE 11 PP Homopolymer 100% PP (HH442H) | SAMPLE 13 PP Homopolymer PB Homopolymer 80% PP-HH442H 20% PB-0800 MELTBLOWN | % Change (PP = Base) |
| Basis Weight | gsm | 80 | 83 | 4% | 80 | 80 | 0% |
| Bulk | mm | 0.71 | 0.58 | — | 0.71 | 0.56 | — |
| Grab Tensile | MD, Dry | | | | | | |
| Peak Load | g | 3271 | 4002 | 22% | 3271 | 3857 | 18% |
| Peak Energy | kg-mm | 56 | 93 | 66% | 56 | 90 | 60% |
| Peak Elong | mm | 26 | 35 | 35% | 26 | 34 | 30% |
| Fail Energy | kg-mm | 112 | 149 | 33% | 112 | 144 | 28% |
| Grab Tensile | CD, Dry | | | | | | |
| Peak Load | g | 3557 | 3421 | −4% | 3557 | 3297 | −7% |
| Peak Energy | kg-mm | 91 | 92 | 1% | 91 | 89 | −3% |
| Peak Elong | mm | 41 | 43 | 5% | 41 | 41 | 1% |
| Fail Energy | kg-mm | 140 | 145 | 4% | 140 | 140 | 0% |
| Trap Tear | | | | | | | |
| MD | g | 823 | 1007 | 22% | 823 | 971 | 18% |
| CD | g | 871 | 699 | −20% | 871 | 674 | −23% |
| Cup Crush | | | | | | | |
| Load | g | 258 | 224 | −13% | 258 | 216 | −16% |
| Energy | g/mm | 5398 | 4505 | −17% | 5398 | 4342 | −20% |
| Drape | | | | | | | |
| MD | cm | 4.4 | 3.9 | −11% | 4.4 | 3.8 | −15% |
| CD | cm | 3.6 | 3.1 | −14% | 3.6 | 3.0 | −17% |

| | | ACTUAL DATA | | |
|---|---|---|---|---|
| | | SAMPLE 11 PP Homopolymer 100% PP (HH442H) MELTBLOWN | SAMPLE 14 PP Copolymer PB Copolymer 80% PP 0.7% ethylene 20% PB-8910 | % Change (PP = Base) |
| Basis Weight | gsm | 80 | 80 | 0% |
| Bulk | mm | 0.71 | 0.56 | — |

TABLE 5-continued

| Grab Tensile | MD, Dry | | | |
|---|---|---|---|---|
| Peak Load | g | 3271 | 3657 | 12% |
| Peak Energy | kg-mm | 56 | 82 | 46% |
| Peak Elong | mm | 26 | 33 | 27% |
| Fail Energy | kg-mm | 112 | 142 | 27% |
| Grab Tensile | CD, Dry | | | |
| Peak Load | g | 3557 | 3222 | −9% |
| Peak Energy | kg-mm | 91 | 112 | 23% |
| Peak Elong | mm | 41 | 53 | 29% |
| Fail Energy | kg-mm | 140 | 149 | 6% |
| Trap Tear | | | | |
| MD | g | 823 | 848 | 3% |
| CD | g | 871 | 753 | −14% |
| Cup Crush | | | | |
| Load | g | 258 | 217 | −16% |
| Energy | g/mm | 5398 | 4325 | −20% |
| Drape | | | | |
| MD | cm | 4.4 | 3.6 | −18% |
| CD | cm | 3.6 | 3.1 | −14% |

As can be seen from Table 5, Sample 12 (100% polypropylene copolymer) was no tougher than the conventional Sample 11 (100% polypropylene homopolymer) although it did possess advantages in terms of drape and conformability. The inventive Sample 13 (homopolymer blend) and Sample 14 (copolymer blend) outperformed the control Sample 11 in terms of toughness, drape, and conformability.

The test results for Sample 11 (control) and Sample 15 (ternary blend) are set forth in Table 6.

As can be seen from Table 6, the ternary blend was not remarkably tougher than the 100% polypropylene control, but the ternary blend was more drapable and conformable.

Samples 16 and 18 were compared to Sample 1 (unbonded). Sample 1 (unbonded) was the same material as shown in Table 1 except it was not bonded. The comparative test results for Sample 1 (unbonded) and for Samples 16 and 18 are reported in Table 7.

TABLE 6

| | | ACTUAL DATA | | | NORMALIZED DATA | | |
|---|---|---|---|---|---|---|---|
| | | SAMPLE 11 100% PP (HH442H) | SAMPLE 15 40% PP-HH442H 40% PP 0.7% ethylene 20% PB-8910 | % Change (PP = Base) | SAMPLE 11 100% PP (HH442H) | SAMPLE 15 40% PP-HH442H 40% PP-0.7% ethylene 20% PB-8910 | % Change (PP = Base) |
| Basis Weight | gsm | 80 | 77 | −4% | 80 | 80 | 0% |
| Bulk | mm | 0.71 | 0.53 | — | 0.71 | 0.55 | — |
| Grab Tensile | MD, Dry | | | | | | |
| Peak Load | g | 3271 | 3536 | 8% | 3271 | 3674 | 12% |
| Peak Energy | kg-mm | 56 | 61 | 9% | 56 | 63 | 13% |
| Peak Elong | mm | 26 | 26 | 0% | 26 | 27 | 4% |
| Fail Energy | kg-mm | 112 | 111 | −1% | 112 | 115 | 3% |
| Grab Tensile | CD, Dry | | | | | | |
| Peak Load | g | 3557 | 3251 | −9% | 3557 | 3378 | −5% |
| Peak Energy | kg-mm | 91 | 68 | −25% | 91 | 71 | −22% |
| Peak Elong | mm | 41 | 41 | 0% | 41 | 43 | 4% |
| Fail Energy | kg-mm | 140 | 105 | −25% | 140 | 109 | −22% |
| Trap Tear | | | | | | | |
| MD | g | 823 | 782 | −5% | 823 | 812 | −1% |
| CD | g | 871 | 652 | −25% | 871 | 677 | −22% |
| Cup Crush | | | | | | | |
| Load | g | 258 | 144 | −44% | 258 | 150 | −42% |
| Energy | g/mm | 5398 | 4165 | −23% | 5398 | 4327 | −20% |
| Drape | | | | | | | |
| MD | cm | 4.4 | 3.9 | −11% | 4.4 | 4.1 | −8% |
| CD | cm | 3.6 | 2.9 | −19% | 3.6 | 3.0 | −16% |

TABLE 7

(All Samples Are Unbonded)

| | | ACTUAL DATA | | | | |
|---|---|---|---|---|---|---|
| | | SAMPLE 1 100% PP (PF015) | SAMPLE 16 100% PP TERPOLYMER | % CHANGE (PP = BASE) | SAMPLE 18 50% TERPOLYMER 50% (HH442H) | % CHANGE (PP = BASE) |
| Basis Weight | gsm | 83 | 88 | 6% | 83 | 0% |
| Bulk | mm | 0.80 | 0.70 | — | 0.74 | — |
| Grab Tensile | MD Dry | | | | | |
| Peak Load | g | 4169 | 5144 | 23% | 5423 | 30% |
| Peak Energy | kg-mm | 112 | 179 | 60% | 189 | 69% |

TABLE 7-continued (All Samples Are Unbonded)

| | | | | | | |
|---|---|---|---|---|---|---|
| Peak Elong | mm | 40 | 51 | 28% | 50 | 25% |
| Fail Energy | kg-mm | 163 | 291 | 79% | 323 | 98% |
| Grab Tensile | CD Dry | | | | | |
| Peak Load | g | 4130 | 4254 | 3% | 5610 | 36% |
| Peak Energy | kg-mm | 98 | 181 | 85% | 252 | 157% |
| Peak Elong | kg-mm | 37 | 64 | 73% | 65 | 76% |
| Fail Energy | kg-mm | 165 | 250 | 52% | 390 | 136% |

NORMALIZED DATA

| | | SAMPLE 1 100% PP (HH442H) | SAMPLE 16 100% TERPOLYMER | % CHANGE (PB = BASE) | SAMPLE 18 50% TERPOLYMER 50% HH442H | % CHANGE (PP = BASE) |
|---|---|---|---|---|---|---|
| Basis Weight | gsm | 80 | 80 | 0% | 80 | 0% |
| Bulk | mm | 0.77 | 0.67 | — | 0.71 | — |
| Grab Tensile | MD Dry | | | | | |
| Peak Load | g | 4018 | 4676 | 16% | 5227 | 30% |
| Peak Energy | kg-mm | 108 | 163 | 51% | 182 | 69% |
| Peak Elong | mm | 39 | 46 | 20% | 48 | 25% |
| Fail Energy | kg-mm | 157 | 265 | 68% | 311 | 98% |
| Grab Tensile | CD Dry | | | | | |
| Peak Load | g | 3981 | 3867 | −3% | 5407 | 36% |
| Peak Energy | kg-mm | 94 | 165 | 74% | 243 | 157% |
| Peak Elong | kg-mm | 36 | 58 | 63% | 63 | 76% |
| Fail Energy | kg-mm | 159 | 227 | 43% | 376 | 136% |

As can be seen in Table 7, the inventive Sample 16 (100% terpolymer) and Sample 18 (50% terpolymer and 50% polypropylene) outperformed the control Sample 1 (100% polypropylene unbonded) in terms of toughness.

Samples 17 and 19 were compared to Sample 1 (bonded). The comparative test results for Sample 1 (bonded) and for Samples 17 and 19 are reported in Table 8.

TABLE 8

(All Samples Are Bonded)

ACTUAL DATA

| | | SAMPLE 1 100% (HH442H) | SAMPLE 17 100% PP TERPOLYMER | % CHANGE (PP = BASE) | SAMPLE 19 50% TERPOLYMER 50% (HH442H) | % CHANGE) (PP = BASE) |
|---|---|---|---|---|---|---|
| Basis Weight | gsm | 82 | 87 | 6% | 75 | −8% |
| Bulk | mm | 0.77 | 0.69 | — | 0.71 | — |
| Grab Tensile | MD Dry | | | | | |
| Peak Load | g | 4578 | 5711 | 25% | 7147 | 56% |
| Peak Energy | kg-mm | 97 | 170 | 75% | 207 | 113% |
| Peak Elong | mm | 33 | 44 | 33% | 47 | 42% |
| Fail Energy | kg-mm | 162 | 262 | 62% | 374 | 131% |
| Grab Tensile | CD Dry | | | | | |
| Peak Load | g | 4416 | 4378 | −1% | 6224 | 41% |
| Peak Energy | kg-mm | 91 | 156 | 71% | 207 | 215% |
| Peak Elong | kg-mm | 33 | 55 | 67% | 68 | 106% |
| Fail Energy | kg-mm | 152 | 225 | 48% | 410 | 170% |
| Grab Tensile | MD Wet | | | | | |
| Peak Load | g | 4488 | 5023 | 17% | 6596 | 47% |
| Peak Energy | kg-mm | 70 | 125 | 61% | 220 | 184% |
| Peak Elong | kg-mm | 28 | 38 | 37% | 49 | 77% |
| Fail Energy | kg-mm | 138 | 186 | 35% | 373 | 170% |
| Grab Tensile | CD Wet | | | | | |
| Peak Load | g | 4510 | 4519 | 0% | 5918 | 31% |
| Peak Energy | kg-mm | 89 | 142 | 60% | 215 | 142% |
| Peak Elong | kg-mm | 32 | 48 | 50% | 56 | 75% |
| Fail Energy | kg-mm | 147 | 220 | 50% | 346 | 135% |
| Trap Tear | | | | | | |
| MD - Load | g | 843 | 1976 | 134% | 2317 | 175% |
| CD - Load | g | 710 | 876 | 23% | 2090 | 194% |
| Cup Crush | | | | | | |
| Load | g | 316 | 288 | −9% | 386 | 22% |
| Energy | g-mm | 6274 | 5440 | −13% | 7665 | 22% |

NORMALIZED DATA

| | SAMPLE 1 100% PP | SAMPLE 17 100% | % CHANGE | SAMPLE 19 50% TERPOLYMER | % CHANGE |
|---|---|---|---|---|---|

TABLE 8-continued (All Samples Are Bonded)

| | | (HH442H) | TER-POLY-MER | (PB = BASE) | 50% HH442H | (PP = BASE) |
|---|---|---|---|---|---|---|
| Basis Weight | gsm | 80 | 80 | 0% | 80 | 0% |
| Bulk | mm | 0.75 | 0.74 | — | 0.76 | — |
| Grab Tensile | MD Dry | | | | | |
| Peak Load | g | 4483 | 5251 | 17% | 7623 | 70% |
| Peak Energy | kg-mm | 95 | 156 | 65% | 221 | 132% |
| Peak Elong | mm | 32 | 40 | 25% | 50 | 55% |
| Fail Energy | kg-mm | 159 | 241 | 52% | 399 | 151% |
| Grab Tensile | CD Dry | | | | | |
| Peak Load | g | 4324 | 4026 | −7% | 6639 | 54% |
| Peak Energy | kg-mm | 89 | 143 | 61% | 306 | 244% |
| Peak Elong | kg-mm | 32 | 51 | 57% | 73 | 124% |
| Fail Energy | kg-mm | 149 | 207 | 39% | 437 | 194% |
| Grab Tensile | MD Wet | | | | | |
| Peak Load | g | 4395 | 4619 | 5% | 7036 | 60% |
| Peak Energy | kg-mm | 76 | 115 | 51% | 235 | 209% |
| Peak Elong | kg-mm | 27 | 35 | 29% | 52 | 93% |
| Fail Energy | kg-mm | 135 | 171 | 27% | 398 | 195% |
| Grab Tensile | CD Wet | | | | | |
| Peak Load | g | 4416 | 4155 | −6% | 6313 | 43% |
| Peak Energy | kg-mm | 87 | 131 | 50% | 229 | 163% |
| Peak Elong | kg-mm | 31 | 44 | 41% | 60 | 91% |
| Fail Energy | kg-mm | 144 | 202 | 41% | 369 | 156% |
| Trap Tear | | | | | | |
| MD - Load | g | 825 | 1817 | 120% | 2471 | 199% |
| CD - Load | g | 695 | 806 | 16% | 2229 | 221% |
| Cup Crush | | | | | | |
| Load | g | 309 | 265 | −14% | 412 | 33% |
| Energy | g-mm. | 6143 | 5002 | −19% | 8176 | 33% |

As can be seen in Table 8, the inventive Sample 17 (100% terpolymer) and Sample 19 (50% terpolymer and 50% polypropylene) outperformed the control Sample 1 (100% polypropylene, unbonded) in terms of toughness and tear resistance although conformability appears to have become poorer.

We claim:

1. A nonwoven web comprising at least one layer consisting of highly drawn and unoriented thermoplastic fibers formed from a blend comprising propylene polymers selected from the group consisting of homopolymers and copolymers of propylene and butylene polymers selected from the group of copolymers of butylene, wherein the blend by weight is from 90% to 50% propylene polymer and from 10% to 50% butylene polymer.

2. A nonwoven web of claim 1, wherein the propylene polymer is a homopolymer.

3. The nonwoven web of claim 2, wherein the butylene copolymer is a copolymer of ethylene.

4. A nonwoven web comprising at least one layer consisting of highly drawn and unoriented thermoplastic fibers formed from a ternary blend comprising two different propylene polymers and a butylene copolymer, wherein the ternary blend by weight is from 10% to 50% butylene copolymer.

5. A nonwoven web of claim 4, wherein one of the propylene polymers is a propylene copolymer of ethylene.

6. A nonwoven web of claim 4, wherein the butylene copolymer is a copolymer of ethylene.

7. A nonwoven web comprising at least one layer consisting of highly drawn and unoriented thermoplastic fibers formed from a blend of a terpolymer, comprising propylene, 1-butene, and ethylene, and propylene polymer comprising at least 80% propylene, wherein the blend by weight is from 90% to 50% polypropylene.

8. A nonwoven wiper comprising a web consisting of highly drawn and unoriented thermoplastic fibers formed from a blend comprising propylene polymers selected from a group consisting of homopolymers and copolymers of propylene and butylene polymers selected from the group consisting of butylene copolymers, wherein the blend by weight is from 90% to 50% propylene polymer and from 10% to 50% butylene polymer.

9. The nonwoven wiper of claim 8, wherein the propylene polymer is a homopolymer.

10. The nonwoven wiper of claim 9, wherein the butylene copolymer is a copolymer of ethylene.

11. The nonwoven wiper of claim 8, wherein the propylene polymer is a copolymer.

12. The nonwoven wiper of claim 11, wherein the propylene copolymer is a copolymer of ethylene.

13. A nonwoven wiper comprising a web consisting of highly drawn and unoriented thermoplastic fibers formed from a ternary blend comprising two different propylene polymers and butylene polymers, wherein the ternary blend by weight is from 10% to 50% polybutylene.

14. The nonwoven wiper of claim 13, wherein the ternary blend comprises a homopolymer of propylene, an ethylene copolymer of propylene, and an ethylene copolymer of butylene.

15. A nonwoven web comprising at least one layer consisting of highly drawn and unoriented thermoplastic fibers formed from a blend comprising propylene copolymers and butylene polymers selected from the group consisting of homopolymers and copolymers of butylene wherein the blend by weight is from 90% to 50% propylene copolymer and from 10% to 50% butylene-ethylene copolymer.

16. The nonwoven web of claim 15, wherein the butylene polymer is a homopolymer.

17. The nonwoven web of claim 16, wherein the propylene copolymer is a copolymer of ethylene.

18. The nonwoven web of claim 15, wherein the butylene polymer is a copolymer.

19. The nonwoven web of claim 18, wherein the butylene copolymer comprises copolymers of ethylene.

20. The nonwoven web of claim 18, wherein the propylene copolymer is a copolymer of ethylene.

21. A nonwoven wiper comprising a web consisting of highly drawn and unoriented thermoplastic fibers formed from a blend of a terpolymer, comprising propylene, 1-butene, and ethylene, and propylene polymer comprising at least 80% propylene, wherein the blend by weight is from 90% to 50% polypropylene.

22. A method for forming a layer of a nonwoven web, the layer consisting of thermoplastic fibers comprising the steps of:
  a. mixing a propylene polymer selected from the group consisting of homopolymers and copolymers of propylene and butylene polymer selected from the group consisting of copolymers of butylene to form a blend, wherein the blend by weight is from 90% to 50% propylene polymer and from 10% to 50% butylene polymer;
  b. heating the blend to form a melt;
  c. extruding the melt through a die to form thermoplastic fibers;
  d. initially drawing the fibers to a ratio of substantially greater than 14 to 1 and then allowing the fibers to solidify in a relaxed condition; and
  e. depositing the fibers to form the layer.

23. The method of claim 22, wherein prior to depositing the fibers, the fibers are quenched.

24. A method of claim 22 or 23, wherein the propylene polymer is a homopolymer.

25. The method of claim 22 or 23, wherein the butylene copolymer is a copolymer of ethylene.

26. The method of claim 22 or 23, wherein after the fibers are deposited, the web is bonded.

27. A method for forming a layer of a nonwoven web, the layer consisting of thermoplastic fibers comprising the steps of:
  a. mixing two different propylene polymers and a butylene polymer to form a ternary blend, wherein the ternary blend by weight is from 10% to 50% butylene polymer;
  b. heating the ternary blend to form a melt;
  c. extruding the melt through a die to form thermoplastic fibers;
  d. initially drawing the fibers to a ratio of substantially greater than 14 to 1 and then allowing the fibers to solidify in a relaxed condition; and
  e. depositing the fibers to form the layer.

28. The method of claim 27, wherein the ternary blend comprises a homopolymer of propylene, an ethylene copolymer of propylene, and an ethylene copolymer of butylene.

29. The method of claim 28, wherein prior to depositing the fiber, the fibers are quenched.

30. The method of claim 28 or 29, wherein after the fibers are deposited, the web is bonded.

31. A method for forming a layer of a nonwoven web, the layer consisting of thermoplastic fibers comprising the steps of:
  a. mixing a terpolymer, comprising propylene, 1-butene, and ethylene, and propylene polymer comprising at least 80% propylene to form a blend, wherein the blend by weight is from 90% to 50% polypropylene;
  b. heating the blend to form a melt;
  c. extruding the melt through a die to form thermoplastic fibers;
  d. initially drawing the fibers to a ratio of substantially greater than 14 to 1 and then allowing the fibers to solidify in a relaxed condition; and
  e. depositing the fibers to form the layer.

32. The method of claim 31, wherein prior to depositing the fiber, the fibers are quenched.

33. The method of claim 31 or 32, wherein after the fibers are deposited, the web is bonded.

34. A method for forming a layer of a nonwoven web, the layer consisting of thermoplastic fibers comprising the steps of:
  a. mixing a propylene copolymer with a butylene polymer selected from the group consisting of butylene homopolymers and copolymers of butylene with ethylene to form a blend, wherein the blend by weight is from 90% to 50% propylene copolymer and from 10% to 50% butylene polymer;
  b. heating the blend to form a melt;
  c. extruding the melt through a die to form thermoplastic fibers;
  d. initially drawing the fibers to a ratio of substantially greater than 14 to 1 and then allowing the fibers to solidify in a relaxed condition; and
  e. depositing the fibers to form the layer.

35. The method of claim 34 wherein prior to depositing the fibers, the fibers are quenched.

36. The method of claim 34 or 35 wherein, after the fibers are deposited, the web is bonded.

37. The method of claim 34 or 35, wherein the butylene polymer is a homopolymer.

38. The method of claim 37, wherein the propylene copolymer is a copolymer of ethylene.

39. The method of claim 34 or 35, wherein the butylene polymer is a copolymer.

40. The method of claim 34, wherein the propylene copolymer and the butylene copolymer are copolymers of ethylene.

* * * * *

UNITED STATES PATENT AND TRADEMARK OFFICE
CERTIFICATE OF CORRECTION

PATENT NO. : 5,204,174

DATED : April 20, 1993

INVENTOR(S) : D. H. Daponte et al.

It is certified that error appears in the above-identified patent and that said Letters Patent is hereby corrected as shown below:

Abstract, line 12-13, "and butylene, terpolymers(..." should read --and butylene), terpolymers(...--;

Column 6, line 18, "Machine configuration:" should read --<u>Machine Configuration:</u>--;

Column 6, line 19-21, --should only be indented slightly and A, B and C should line up.--

Column 6, line 19-21, --also C. should not be underlined--;

Column 5, Table 1, "11 8%" should read --8%--;

Column 7, line 27, "(k.gmm)" should read --(k-gmm)--;

Column 8, line 46, "machine configuration" should read --<u>Machine Configuration</u>--;

Column 8, line 47-49, --should only be slightly indented, and A, B and C should all line up.--;

Column 9-10, Table 2, --Sample 3 and Sample 4 labels should be level--;

Column 9-10, Table 3, --Sample 3 and Sample 4 labels should be level--;

Column 10, line 5-6, --These two lines should be moved down below Tables 2 and 3 to keep them in line with the rest of the chart and easier to read--;

UNITED STATES PATENT AND TRADEMARK OFFICE
CERTIFICATE OF CORRECTION

PATENT NO. : 5,204,174
DATED : April 20, 1993
INVENTOR(S) : D. H. Daponte et al.

It is certified that error appears in the above-identified patent and that said Letters Patent is hereby corrected as shown below:

Column 10, line 5-6, --also A, B and C should be lined up.--

Column 10, line 48, "Set Point Samples 5-10" should read --<u>Set points: Samples 5-10</u>--;

Column 12, line 15, "machine configuration:" should read --<u>Machine Configuration:</u>--;

Column 12, line 16-19, --A, B and C should only be slightly indented and all line-up.--

Column 12, line 54, "fpm D D" should read --fpm D D 27--;

Column 13, line 2, "machine configuration:" should read --<u>Machine Configuration:</u>--;

Column 13, line 3-5, "A, B, and C should be only slightly indented and all should line up.--;

Column 14, line 1-9, --Should be in column 13 and chart should not be split up like this. It is difficult to read and understand--;

Column 13-14, Table 5, --Sample 11 and Sample 12 labels should be level.--;

Column 13-14, Table 5, --Sample 11 and Sample 13 labels should be level.--;

Column 14, Table 5, "0.7% ethylene" should read --(0.7% Ethylene)--;

UNITED STATES PATENT AND TRADEMARK OFFICE
CERTIFICATE OF CORRECTION

PATENT NO. : 5,204,174
DATED : April 20, 1993
INVENTOR(S) : D. H. Daponte et al.

It is certified that error appears in the above-identified patent and that said Letters Patent is hereby corrected as shown below:

Column 13-14, Table 5, --Sample 11 and Sample 14 labels should line up.;

Column 15-16, Table 6, --Sample 11 and Sample 15 labels should be level.--;

Column 15-16, Table 6, "0.7% ethylene" should read --(0.7% Ethylene)--;

Column 15-16, Table 7, --All "Sample #" labels should be level--;

Column 17-18, Table 7, --All "Sample #" labels should be level--;

Column 17-18, Table 8, --All "Sample #" labels should be level--;

Column 22, line 54, "of claim 34," should read --of claim 39,--.

Signed and Sealed this

Twenty-sixth Day of March, 1996

Attest:

BRUCE LEHMAN

*Attesting Officer*     *Commissioner of Patents and Trademarks*